United States Patent
Gabber et al.

(10) Patent No.: US 6,574,658 B1
(45) Date of Patent: Jun. 3, 2003

(54) SYSTEM AND METHOD FOR SECURE CLASSIFICATION OF ELECTRONIC MAIL

(75) Inventors: Eran Gabber, Summit, NJ (US); Bjorn M. Jakobsson, Hoboken, NJ (US); Yossi Matias, Tel Aviv (IL); Alain J. Mayer, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/240,079

(22) Filed: Jan. 29, 1999

(51) Int. Cl.[7] .............................................. G06F 17/00
(52) U.S. Cl. ......................... 709/206; 709/228; 370/13
(58) Field of Search ................................. 709/201, 206, 709/227, 238, 224, 228, 226, 218; 370/94.1

(56) References Cited

U.S. PATENT DOCUMENTS

| | | | | |
|---|---|---|---|---|
| 5,479,408 A | * | 12/1995 | Will ........................... | 370/94.1 |
| 5,541,911 A | * | 7/1996 | Nilakantan et al. ............ | 370/13 |
| 5,859,967 A | * | 1/1999 | Kaufeld et al. ............. | 709/238 |
| 5,930,479 A | * | 7/1999 | Hall ........................... | 709/227 |
| 6,175,857 B1 | * | 1/2001 | Hachiya et al. ............. | 709/206 |

* cited by examiner

*Primary Examiner*—Ayaz Sheikh
*Assistant Examiner*—Khanh Quang Dinh (57) ABSTRACT

A system for, and method of, generating an extended source electronic mail (e-mail) address for use between a sender and a recipient and systems and methods for creating e-mail messages having a destination-dependent extended source address structure. In one embodiment, the system includes: (1) an extension generator module, associated with the sender, that generates a valid extended source address that is based on the identity of the recipient, (2) an e-mail transmitter, associated with the extension generator module, that transmits the e-mail message containing the valid extended source address to the recipient and (3) a message receiver module, associated with the extension generator module, that classifies incoming e-mail messages based on valid extended source addresses.

28 Claims, 4 Drawing Sheets

SYSTEM AND METHOD FOR SECURE CLASSIFICATION OF ELECTRONIC MAIL

CROSS REFERENCE TO RELATED APPLICATION

The present invention is related to that disclosed in Ser. No. 08/787,557, filed on Jan. 22, 1997, entitled "System and Method for Providing Anonymous Personalized Browsing in a Network" and commonly assigned with the present invention and incorporated by reference.

The present invention is also related to that disclosed in Ser. No. 09/041,209 filed on Mar. 12, 1998, and entitled "System and Method for Providing Anonymous Remailing and Filtering of Electronic Mail," commonly assigned with the present invention and incorporated herein by reference.

TECHNICAL FIELD OF THE INVENTION

The present invention is directed, in general, to cryptographic techniques for electronic communications and, more specifically, to a system and method for secure classification of electronic mail.

BACKGROUND OF THE INVENTION

In recent years, the availability of more efficient, reliable and cost-effective computers and networking tools has allowed many companies and individuals (collectively, "users") to become involved in an ever-growing electronic community. The immeasurable gains in technology experienced by the computer industry overall have allowed these users to rely on commercially available computers, such as personal computers ("PCs"), to meet their information processing and communication needs. To that end, PC manufacturers allow users to equip most PCs with an interface (such as a modem) that may be used for communication over networks, such as the Internet. The Internet is a well-known collection of networks (e.g., public and private voice, data, video and multimedia networks) that cooperate using common protocols to form a worldwide network of networks.

Cooperation often includes the communication of electronic mail ("e-mail") from one user (a "sender") to another (a "recipient"). One conventional e-mail protocol employed over the Internet, Standard Mail Transfer Protocol ("SMTP"), mandates that each e-mail message body have a header that includes the sender's e-mail address (a "source address" or a "return address") and the recipient's e-mail address (a "destination address"). All well-known e-mail protocols mandate inclusion of a source address to allow the recipient to send e-mail back to the sender.

As more users rely on e-mail for daily communication, both for their work and personal use, it is becoming important to be able to classify and sort their e-mail. Classification allows users to treat classes of e-mail messages differently providing for sorting and storing into appropriate folders or deleting them without inspection if desired. The need for classification techniques is growing because certain senders, who are abusing the use of e-mail, are causing the recipients increasing problems. Perhaps the most widespread example of abuse is the mass mailing of unsolicited e-mail messages based on address lists collected from various sources to which recipients have supplied their e-mail addresses for other purposes. The act of sending this "junk e-mail" in large quantity is called "spamming" and currently threatens to overwhelm and thwart the process of legitimate e-mail.

Spamming is facilitated by the fact that it is relatively easy to obtain a list of valid e-mail addresses and to use them without the corresponding owner's consent. Many users provide their e-mail addresses to World Wide Web ("WWW") sites, for newsgroups, or include them in their home pages. Spammers collect e-mail addresses from these places for their use. Finally, the incremental cost of generating a large number of spam messages is relatively low for the spammer, since sending one million copies of a message is almost as easy as sending one thousand copies with current technology.

Spamming creates a problem since a recipient often cannot distinguish between a personal e-mail message and an unsolicited spam message before opening the e-mail. Typically there is no characteristic envelope or sender's address that facilitates recognition of spam before it is opened. Spam messages often clog the recipient's mailbox necessitating time-consuming examination prior to removal.

Current e-mail tools may use one or a combination of several methods for detecting and controlling spam. Source address filtering allows a user to establish a list of known spammer e-mail addresses such that these source addresses may be removed automatically. However, many spammers disguise their true addresses by various means and frequently "mutate" among various bogus return addresses thereby defeating this filtering process. Another method for detecting spam is keyword filtering, in which the user collects a list of often-used words, which are found in the subject-line or body of junk e-mail messages, and use these keywords to recognize and remove spam messages automatically. This method is heuristic at best and may eliminate some valid or wanted messages. Furthermore, spammers have started to adapt to such filtering by changing the vocabulary of their messages. Moreover, keyword filtering is useless to detect spam messages that are included in other media types, such as image or sound e-mail attachment.

Most e-mail users typically have only a small number of e-mail addresses, for example, one at the office and one for private use at home through an Internet service provider ("ISP"). Changing the user's e-mail address is a often tedious and usually a last-resort action when their e-mail is constantly overloaded with spam messages. This change necessitates that the user notify all potential senders, from whom the user expects to receive e-mail messages.

Accordingly, what is needed in the art is a way to recognize and delete spam messages automatically and reliably.

SUMMARY OF THE INVENTION

To address the above-discussed deficiencies of the prior art, the present invention provides a system for, and method of generating an extended electronic mail (e-mail) address for use between a sender and a recipient and systems and methods for classifying e-mail messages based on the destination extended address. The present invention requires that all e-mail messages contain a source address and a destination address. In one embodiment, the system includes: (1) an extension generator module, associated with the sender, that generates a valid extended source address that is based on the identity of the recipient, (2) an e-mail transmitter, associated with the extension generator module, that transmits the e-mail message containing the valid extended source address to the recipient and (3) a message receiver module, associated with the extension generator module, that classifies incoming e-mail messages based on their destination address.

The destination address should be a valid extended address that was previously generated by the extension generator. When the recipient replies to the sender, the destination address of the reply e-mail message is the sender's source address. In other words, the extended source addresses of the messages that the sender transmits may be used later as destination addresses in the messages that the sender receives.

In one embodiment of the present invention, the sender must apply to the recipient for a valid extended destination address. If the sender does not thereafter address the message to a valid extended destination address, the recipient's message receiver module will reject the message and will thus not present it to the recipient.

The present invention therefore introduces the broad concept of generating and verifying e-mail addresses between particular parties as a prerequisite to establishing general e-mail communication. Preferably, application for an extended destination address by the sender entails an economic cost, perhaps embodied in the computer time required to be spent to generate the address. It is believed that mass e-mailers ("spammers") will be loathe to spend the computational time necessary to apply for a suitably large list of extended destination addresses.

In one embodiment of the present invention, the system further includes a destination lookup module, associated with the extension generator module, that stores the extended destination address for future use. Thus, once the sender applies to the recipient for an extended destination address and receives one from the recipient, this extended destination address may be stored and used for all future messages sent to the same recipient until it is revoked by the recipient. Alternatively, extended destination addresses may be designed for one-time use. The destination lookup module may further store a shared key employable to generate the valid extended source address.

In one embodiment of the present invention, the sender may instruct his message receiver module to dispose of messages sent by a particular recipient by revoking the extended destination address that the sender has previously included in the message that he has sent to that recipient. Thus, the message receiver module acts as a filter, disposing of unwanted e-mail messages, and accepting other e-mail messages.

In one embodiment of the present invention, the system further includes a handshake module, associated with the extension generator module and containing the e-mail transmitter, that applies to the recipient for a valid extended destination address after receiving a first rejection message from the recipient.

In one embodiment of the present invention, the handshake module computes a time-consuming cost function, and submits the results of this computation in order to apply to the recipient for a valid extended destination address.

In one embodiment of the present invention, the system further includes a hypertext transfer protocol (HTTP) proxy, associated with the sender and containing the extension generator module, that computes the extended source address when the sender is asked to provide a valid e-mail address for registration at a World Wide Web site. The present invention is therefore applicable in a Web-surfing environment.

In one embodiment of the present invention, the system further includes a state information database containing a counter corresponding to the recipient, the extended source address further being based on a value of the counter. The function of the state information database and its associated counters will be described in detail below.

In one embodiment of the present invention, the system further includes a hypertext transfer protocol (HTTP) server, coupled to the state information database, that controls the extension generator module and allows manual applications for valid extended addresses.

The present invention may be employed by the sender, by the recipient, or both. If it is used by only one party, then the other party must apply manually to receive a valid extended destination address to assure that the e-mail will be indeed delivered to the other side.

When the recipient replies to the sender, the destination address of the reply e-mail message is the sender's source address. In other words, the extended source addresses of the messages that the sender transmits are used later as destination addresses in the messages that the sender receives. This allows the sender to classify incoming e-mail messages based on the destination addresses included in those messages.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
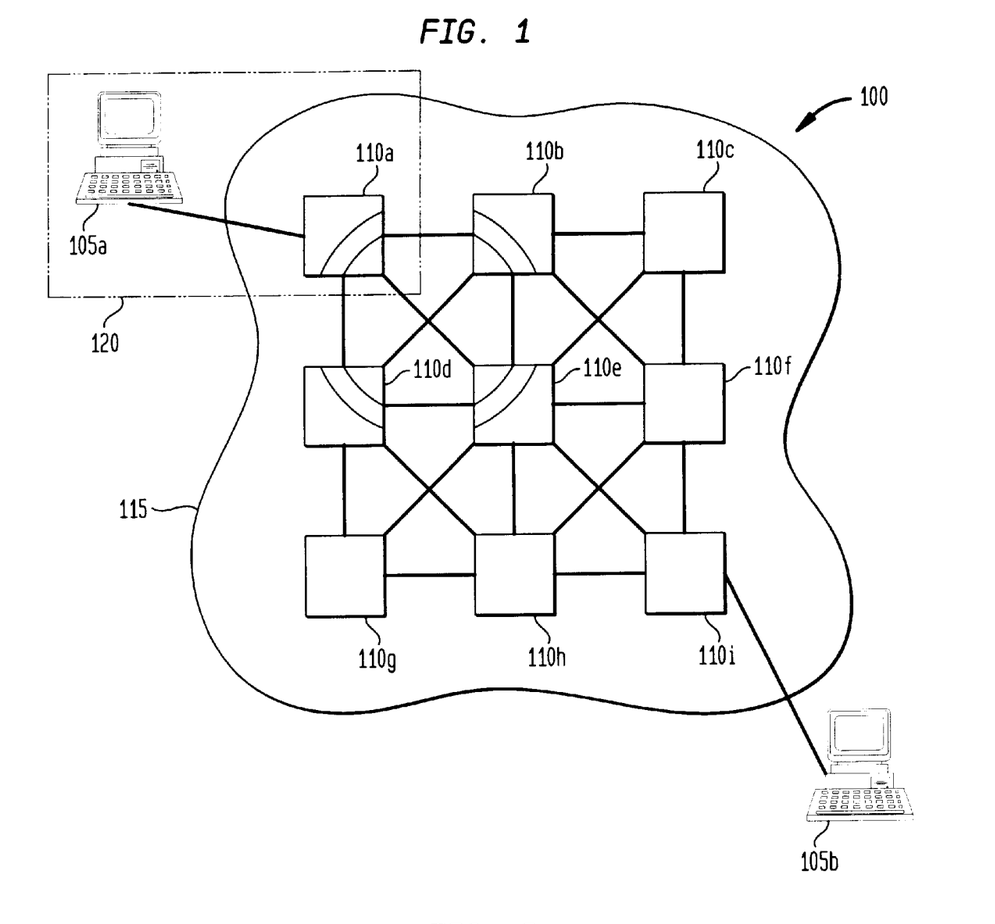
FIG. 1 illustrates a high-level block diagram of an exemplary distributed network with which the principles of the present invention may be suitably used.

Referring initially to FIG. 1, illustrated is a high-level block diagram of an exemplary distributed network (generally designated 100) with which the principles of the present invention may be suitably used to provide an electronic mail classification service that assigns destination-dependent alias source addresses to a sender's e-mail. The distributed network 100 illustratively includes a plurality of computer systems 110a, 110b, 110c, 110d, 110e, 110f, 110g, 110h, 110i that are illustratively coupled together to form the Internet 115. The Internet 115 includes the World Wide Web, which is not a network itself, but rather an "abstraction" maintained on top of the Internet 115 effected by a combination of browsers, server sites (as may be hosted on the plurality of computer systems 110a, 110b, 110c, 110d, 110e, 110f, 110g, 110h, 110i), HyperText Markup Language ("HTML") pages and the like.

Although the illustrated embodiment is suitably implemented for and used over the Internet 115, the principles and broad scope of the present invention may be associated with any appropriately arranged computer, communications, multimedia or other network, whether wired or wireless. Further, though the principles of the present invention are illustrated using a single computer system, such as one of the plurality of computer systems 110a, 110b, 110c, 110d, 110e, 110f, 110g, 110h, 110i, alternate embodiments within the scope of the same may include more than a single computer system.

The exemplary network 100 is assumed to include a plurality of (assumed) insecure communication channels that operate to intercouple ones of the various computer systems 110a, 110b, 110c, 110d, 110e, 110f, 110g, 110h, 110i of the network 100. The concept of communication channels is known and allows insecure communication of information among ones of the intercoupled computer systems (the Internet employs conventional communication protocols, such as SMTP, that are also known). A distributed network operating system executes on at least some of computer systems 110a, 110b, 110c, 110d, 110e, 110f, 110g, 110h, 110i and may manage the insecure communication of information therebetween. Distributed network operating systems are also known.

FIG. 1 also illustrates first and second user's computer systems 105a, 105b, which are assumed, for purposes of the following discussion, to be associated with an e-mail sender and an e-mail recipient, respectively. Thus, a sender may apply his real source address and a destination address corresponding to the recipient to a particular e-mail message and send the e-mail message to the recipient via the network 100 and the second user's computer.

The first user's computer system may be associated with a particular computer system 110a (such association denoted by a broken line 120. The particular computer system 110a acts as a home site for the first user's computer system and a provider of Internet service.

Figure 2:
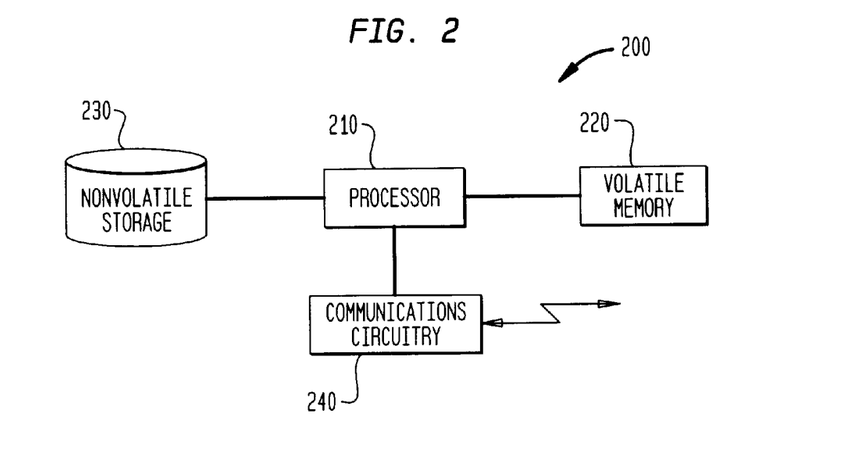
FIG. 2 illustrates a block diagram of a computer system that may be employed in the network of FIG. 1 to provide an environment within which the present invention can operate.

Turning now to FIG. 2, illustrated is a block diagram of data processing and storage circuitry, generally designated 200, that may be employed in the network of FIG. 1 to provide an environment within which the present invention can operate. The circuitry 200 comprises a processor 210, volatile memory 220, a nonvolatile mass storage unit 230 and communication circuitry 240.

The circuitry 200 illustrated in FIG. 2 is intended to represent a wide array of computing platforms. Accordingly, the circuitry 200 may be a mainframe, minicomputer or personal computer ("PC"). The present invention is not limited whatsoever to a particular class of computing platform. With reference back to it FIG. 1 and continuing reference to FIG. 2, each of the plurality of computer systems 110a, 110b, 110c, 110d, 110e, 110f, 110g, 110h, 110i and the first and second user's computer systems 105a, 105b may have the circuitry illustrated in FIG. 2 associated therewith.

The present invention may be embodied as a sequence of instructions executable in the data processing and storage circuitry 200 to yield an alias source address generator, an alias source address substitutor, and an e-mail filter as the present invention provides.

Figure 3:
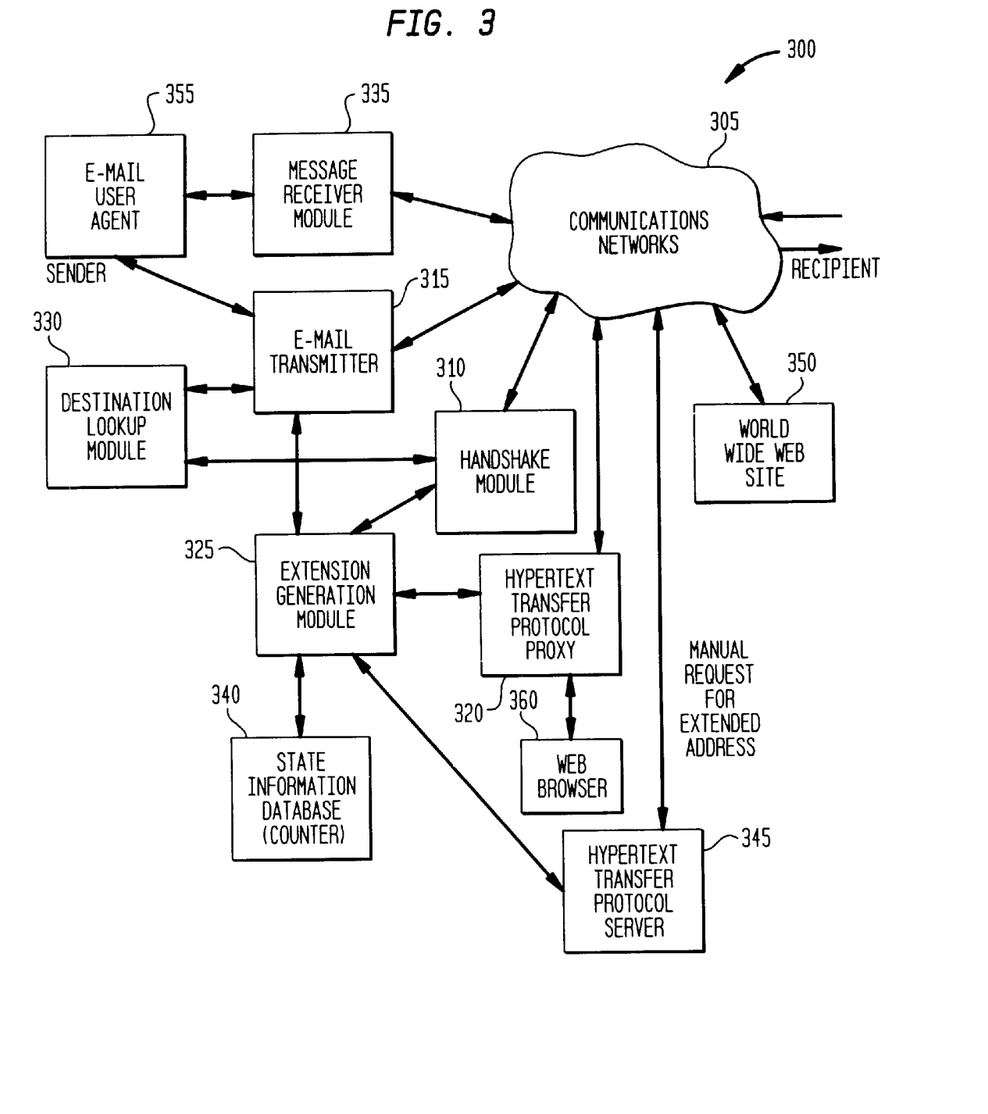
FIG. 3 illustrates a system for generating an extended source address for use with e-mail between a sender and a recipient.

Turning now to FIG. 3, illustrated is a system 300 for generating an extended source address for use with e-mail between a sender and a recipient. The system 300 includes a communications network 305, a handshake module 310, an e-mail transmitter 315, a hypertext transfer protocol proxy 320, an extension generator module 325, a destination lookup module 330, a message receiver module 335, a state information database 340, a hypertext transfer protocol server 345, a World Wide Web site 350, an e-mail user agent 355 and a Web browser 360. The system 300 provides a system for and method of generating an extended source e-mail address for use between a sender and a recipient that creates e-mail messages having a destination-dependent extended source address structure.

In this embodiment, the system 300 is seen to include the extension generator module 325, associated with a sender, that generates an unverified extended source (UES) address that is based on an identity of the recipient. The UES is generated in response to a first e-mail message from the recipient. The system 300 also includes the e-mail transmitter 315 associated with the extension generator module 325 that transmits a second e-mail message containing the UES address to the recipient for verification of the UES address.

An extended source address is genuine if it was indeed generated previously by the extension generator module 325. A UES address cannot be proven to be genuine without checking it against a list of previously generated extended source addresses. Later, we will describe how the present invention may generate verified extended source (VES) addresses, which can be proven to be genuine without checking the entire list of previously generated addresses.

The present invention introduces the broad concept of generating and verifying e-mail addresses between particular parties as a prerequisite to establishing general e-mail communication. Preferably, application for the UES address entails a significant economic cost, typically embodied in the computer time required to generate the application. It is believed that spammers will be unwilling or unable to spend the computational time necessary to apply for a suitably large list of extended source addresses. The mere fact that the present invention requires spammers to engage in a bidirectional communication with potential recipients may be enough to thwart most spammers. The system 300 further includes the destination lookup module 330, associated with the extension generator module 325, that stores the UES address for future messages sent to the same destination (recipient). Note that the sender previously applied for the extended destination address and then stored this address in the destination lookup module 330. Extended destination addresses are always generated by the recipient and extended source addresses are always generated by the sender of the message.

The system 300 still further includes the message receiver module 335, associated with the extension generator module 325, that receives and classifies incoming e-mail based on this extended destination. The message receiver module 335 acts as a filter, disposing of e-mail messages that fall within undesirable or blacklist categories. Alternately, the message receiver module 335 accepts e-mail messages that fall within desirable or whitelist categories. The message receiver module 335 may share a secret key with the extension generator module 325, which is used for generation and verification of VES addresses.

In one implementation, the VES address consists of the UES address followed by a message authentication code (MAC) of the UES. The MAC is keyed with the above shared secret. In this way, the message receiver module 335 may verify that a given extended address was indeed generated by the extension generation module 325 without searching through a list of all generated extended addresses. Therefore, in the following discussion the term "extended source address" may mean either a UES or VES address. Through this process, the extended source address may be created, verified and then stored. Alternatively, extended source addresses may be designed for one-time use only, if desired.

The handshake module 310, which contains the e-mail transmitter 315, is associated with the extension generator module 325, as shown, and both receives the first e-mail message and manages generation of the corresponding UES or VES address. The handshake module 310 is employed by the system 300 to implement the handshaking protocol for obtaining an extended address. The handshake protocol involves a procedure that is unacceptable to a spammer, as stated earlier. This would typically involve receiving a valid return address and require a certain amount of computing time or interaction in order to complete the handshake. Legitimate e-mailers would accept this condition, but spammers typically would not. If the sender's message is satisfactory to the recipient, the sender would receive a reply with a valid extended address for the recipient.

The present invention is also applicable in a Web-surfing environment. When the sender uses the Web browser 360 to register, the hypertext transfer protocol proxy 320 recognizes that the sender should provide a valid e-mail address. The hypertext transfer protocol proxy 320 requests that the extension generation module 325 generate a valid extended source address (e.g., UES or VES) for the sender. The hypertext transfer protocol proxy 320 then sends the generated extended address to the World Wide Web site 350. This configuration may be used to create a consistent set of aliases for the sender. This allows the sender to later identify the source used by e-mail spammers and filter that particular address without affecting other desired e-mail.

The system 300 further includes the state information database 340 containing a counter corresponding to each recipient. The UES address may be based on a value of the counter. The function of the state information database 340 and its associated counters is to monitor the state of the extensions used by the recipient to communicate with the sender. Suppose the sender revokes a particular extended address that had been used by two recipients for communicating with the sender, for example, and later the sender wants to re-establish communications with one of them. The extension generator module 325 addresses the counter stored in the state information database 340 for the desired recipient and increments it at the time that the sender re-establishes an extension for this recipient. The state information database 340 may typically maintain present counter information and may also provide archival counter information as required.

The hypertext transfer protocol server 345 is coupled to the state information database 340 and controls the extension generator module 325 thereby allowing manual applications to be accommodated for the UES address. Manual requests may be generated by external initiators that access the sender's hypertext transfer protocol site to obtain and download an applet, which may also compute a cost function, that is then run on the requestor's computer system. This applet implements the handshake protocol for initiators who may not employ a complete set of modules, as shown.

Figure 4:
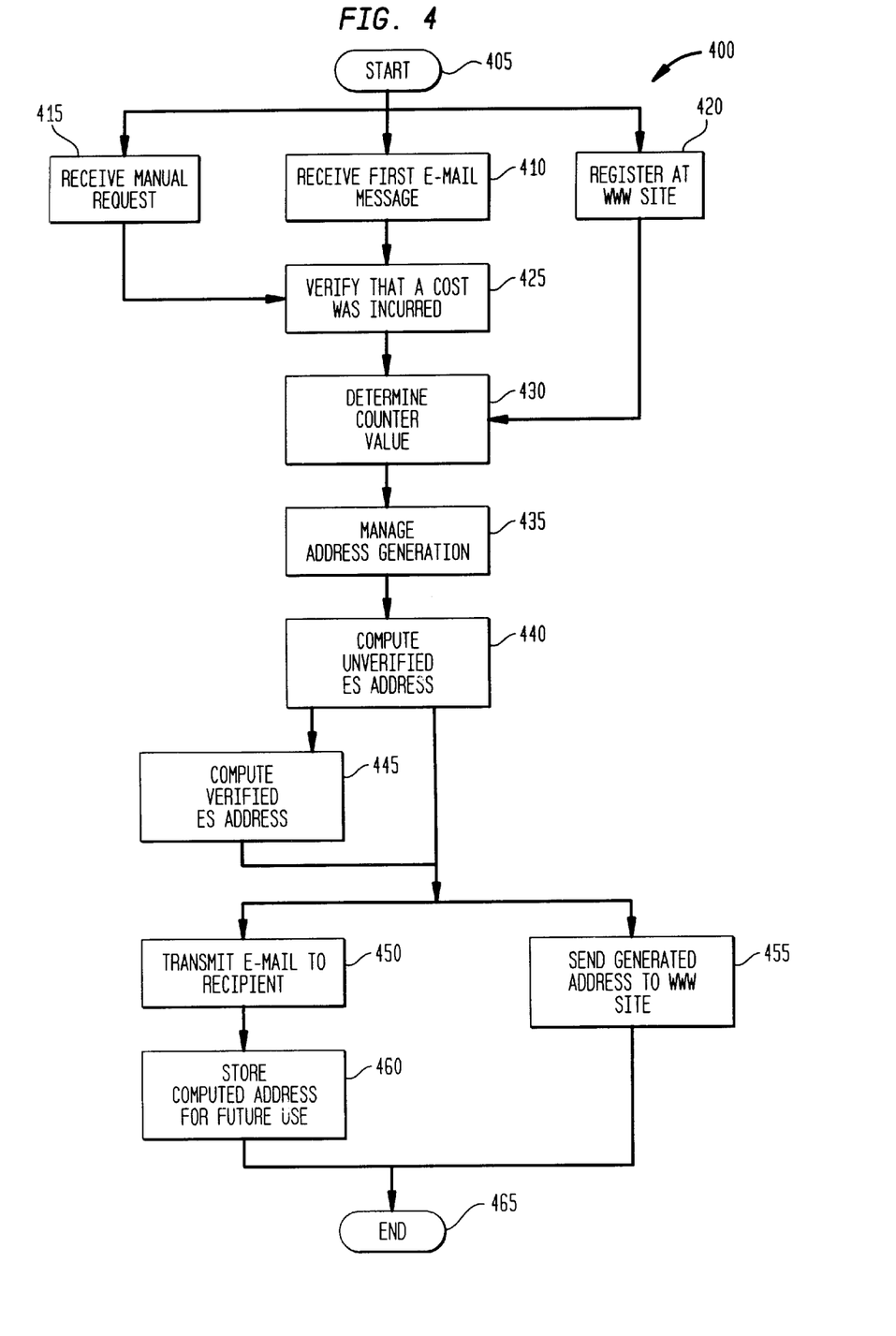
FIG. 4 illustrates a flow diagram of one embodiment of a method of generating an extended source address for use with e-mail.

Turning now to FIG. 4, illustrated is a flow diagram 400 of one embodiment of a method of generating an extended source address for use with e-mail. The flow chart 400 illustrates the steps of generating, in response to a first e-mail message from the recipient, an extended source address (UES or VES) that is based on an identity of the recipient and then transmitting a second e-mail message containing the extended source address to the recipient.

The method begins in a step 405, wherein either a first e-mail message request is received in a step 410, a manual request is received in a step 415 or the user registers at a World Wide Web site in a step 420. After receiving the first e-mail message or a manual request, the request is verified to insure that a cost was incurred in a step 425. No verification is performed if the user registers at a World Wide Web site (the step 420). Next, the value of a counter corresponding to the requester, if the request started in the steps 410 or 415, or corresponding to the World Wide Web site, if the request started in the step 420, is determined in a state information database in a step 430. An extended address, based on this counter, is generated in the step 430.

The extended address generation is managed in a handshake module in a step 435 if the request started in the step 410 or 415, or it is managed by a hypertext transfer protocol proxy if the request started in the step 420. A UES address is computed in a step 440 using an extension generation module. The extension generation module may generate a VES address in a step 445 based on the UES generated in the step 440. The extended address is transmitted to the recipient via a second e-mail message in a step 450 if the request started in the step 410 or 415, or sent to the World Wide Web site if the request started in the step 420. The extended address is stored by the recipient for future use in the address database associated with a destination lookup module in a step 460. The method ends in a step 465.

Figure 5:
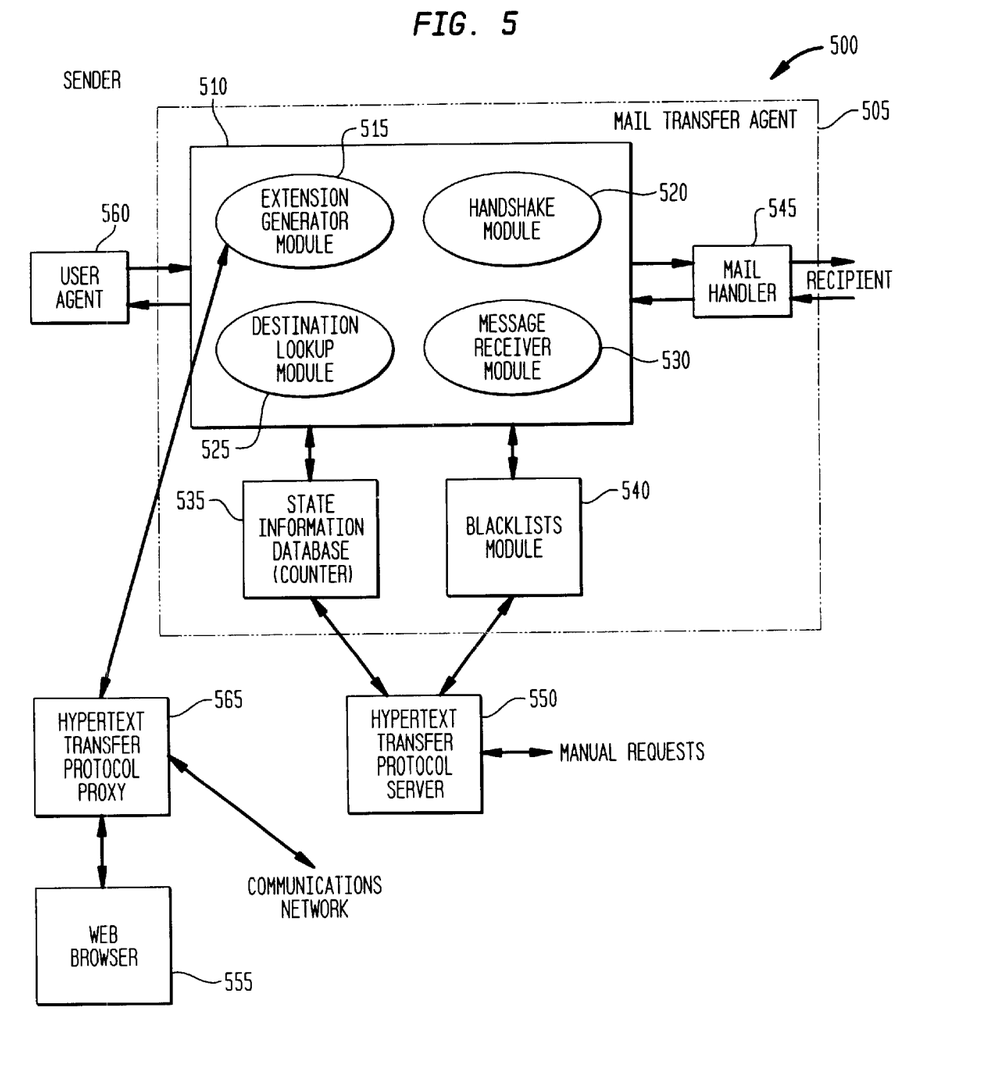
FIG. 5 illustrates a mail transfer agent for processing e-mail between a sender and a recipient.

Turning now to FIG. 5, illustrated is a mail transfer agent for processing e-mail between a sender and a recipient. The diagram 500 includes a mail transfer agent 505 comprising a gatekeeper module 510 which itself includes an extension generator module 515, a handshake module 520, a destination lookup module 525 and a message receiver module 530; in addition to a state information database 535; a blacklist module 540 and a mail handler 545. The diagram 500 also includes a hypertext transfer protocol server 550; a Web browser 555, a user agent 560 and a hypertext transfer protocol proxy 565.

The mail transfer agent 505 processes e-mail between a sender and a recipient. The extension generator module 515 is associated with the sender and generates an extended source address that is based on an identity of the recipient. This is done in response to a first e-mail message from the recipient. The handshake module 520, which is also associated with the extension generator module 515, receives the first e-mail message and manages generation of the extended source address. The handshake module 520 is also used to apply for a valid extended destination address from the recipient. The destination lookup module 525 is associated with the handshake module 520 and stores the extended destination address for future use. The message receiver module 530 is associated with the extension generator module 515 and it both receives and classifies incoming e-mail based on their extended destination addresses.

The hypertext transfer protocol proxy 565, is associated with the sender, and also contains the extension generator module 515 that computes the extended source address when the sender registers at a World Wide Web site using the Web browser 555. The state information database 535 contains a counter corresponding to the recipient allowing the extended source address to be based on a value of the counter. The hypertext transfer protocol server 550, coupled to the state information database 535, controls the extension generator module 515 and allows manual requests for the UES address to be accommodated. The blacklist module 540, associated with the extension generator module 515, contains extended source addresses that are to be blocked. The user agent 560 and the mail handler 545 send and receive e-mail messages.

From the above, it is apparent that the present invention provides a system for, and method of generating an extended source electronic mail (e-mail) address for use between a sender and a recipient and systems and methods for creating e-mail messages having a destination-dependent extended source address structure. In one embodiment, the system includes: (1) an extension generator module, associated with the sender, that generates, in response to a first e-mail message from the recipient, an extended source address that is based on an identity of the recipient and (2) an e-mail transmitter, associated with the extension generator module, that transmits a second e-mail message containing the extended source address to the recipient.

Although the present invention has been described in detail, those skilled in the art should understand that they can make various changes, substitutions and alterations herein without departing from the spirit and scope of the invention in its broadest form.

What is claimed is:

1. A system for generating an extended source address for use with electronic mail (e-mail) between a sender and a recipient, comprising:
    an extension generator module, associated with said sender, that generates a valid extended source address that is based on an identity of said recipient;
    an e-mail transmitter, associated with said extension generator module, that transmits said e-mail message containing said valid extended source address to said recipient; and
    a message receiver module, associated with said extension generator module, that classifies incoming e-mail messages based on valid extended destination addresses.

2. The system as recited in claim 1 further comprising a handshake module that applies for a valid destination address from said recipient.

3. The system as recited in claim 2 further comprising a destination lookup module, associated with said handshake module, that stores said valid destination address for future messages sent to said recipient.

4. The system as recited in claim 2 wherein said extension generator module further shares a key with said message receiver module, said key being employed to generate valid extended source addresses and verify destination addresses of incoming e-mail messages.

5. The system as recited in claim 1 further comprising a handshake module, associated with said extension generator module and containing said e-mail transmitter, that receives said first e-mail message and manages generation of said valid extended source address.

6. The system as recited in claim 1 further comprising a hypertext transfer protocol proxy, associated with said sender and containing said extension generator module, that computes said valid extended source address when said sender registers at a World Wide Web site.

7. The system as recited in claim 1 further comprising a state information database containing a counter corresponding to said recipient, said valid extended source address further being based on a value of said counter.

8. The system as recited in claim 6 further comprising a hypertext transfer protocol server, coupled to said state information database, that controls said extension generator module and allows manual requests for said valid extended address.

9. The system as recited in claim 5 wherein said system confirms that said sender incurred a cost.

10. The system as recited in claim 8 wherein said system confirms that said manual requests incurred a cost.

11. The system as recited in claim 1 wherein said extended source address is revocable by said sender, said message receiver module further classifying incoming e-mail messages based on a list of revoked extended source addresses.

12. A method of generating an extended source address for use with electronic mail (e-mail), comprising:
    generating, in response to a first e-mail message from said recipient, an valid extended source address that is based on said identity of said recipient;
    transmitting a second e-mail message containing said valid extended source address to said recipient for use by said recipient as a destination address in future messages to said sender; and
    classifying incoming e-mail messages based on associated valid extended destination addresses.

13. The method as recited in claim 12 further comprising applying for a valid destination address from said recipient.

14. The method as recited in claim 13 further comprising storing said valid destination address for future messages sent to said recipient.

15. The method as recited in claim 13 further comprising further sharing a key with said message receiver module, said key being employed to generate valid extended source addresses and verify destination addresses of incoming e-mail messages.

16. The method as recited in claim 12 further comprising receiving said first e-mail message and managing generation of said valid extended source address.

17. The method as recited in claim 12 further comprising computing said valid extended source address when said sender registers at a World Wide Web site.

18. The method as recited in claim 12 further comprising activating a counter corresponding to said recipient in a state information database, said valid extended source address further being based on a value of said counter.

19. The method as recited in claim 17 further comprising controlling said extension generator module and allowing manual requests for said valid extended address.

20. The method as recited in claim 16 further comprising confirming that said sender incurred a cost.

21. The method as recited in claim 19 further comprising confirming that said manual requests incurred a cost.

22. The method as recited in claim 12 wherein said extended source address is revocable by said sender, said method comprising classifying incoming e-mail messages based on a list of revoked extended source addresses.

23. A mail transfer agent for processing electronic mail (e-mail) between a sender and a recipient, comprising:
    an extension generator module, associated with said sender, that generates, in response to a first e-mail message from said recipient, an valid extended source address that is based on an identity of said recipient;
    a destination lookup module, associated with said extension generator module, that stores said valid extended source address for future use;

a handshake module, associated with said extension generator module, that receives said first e-mail message and manages generation of said valid extended source address; and a message receiver module, associated with said extension generator module, that classifies incoming e-mail messages based on valid extended source addresses.

24. The agent as recited in claim 23 wherein said destination lookup module further stores a shared key employable to generate said valid extended source address.

25. The agent as recited in claim 23 further comprising a hypertext transfer protocol proxy, associated with said sender and containing said extension generator module, that computes said valid extended source address when said sender registers at a World Wide Web site.

26. The agent as recited in claim 23 further comprising a state information database containing a counter corresponding to said recipient, said valid extended source address further being based on a value of said counter.

27. The agent as recited in claim 26 further comprising a hypertext transfer protocol server, coupled to said state information database, that controls said extension generator module and allows manual requests for said valid extended source address.

28. The agent as recited in claim 26 further comprising a blacklist, associated with said extension generator module, that contains extended source addresses to block.

* * * * *